Feb. 18, 1969  B. P. UPDEGRAFF  3,428,030
SMALL ANIMAL RESTRAINING BOX
Filed Dec. 8, 1966
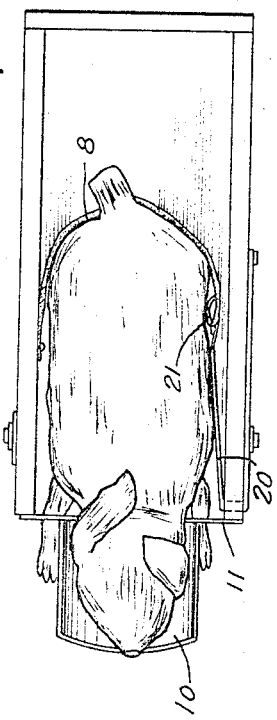
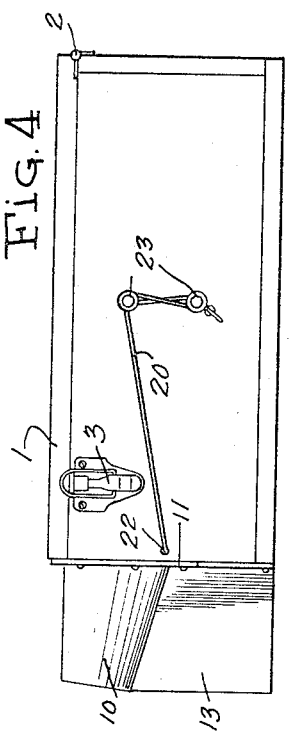
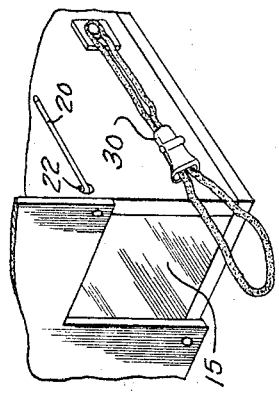
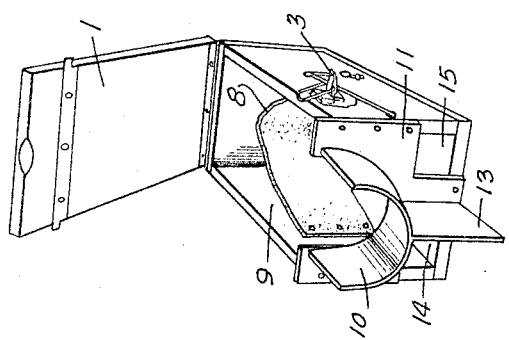
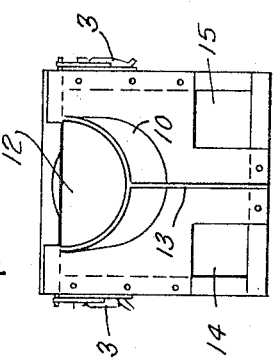
INVENTOR.
BILLY P. UPDEGRAFF
BY
Harvey J. Boyd
ATTORNEY United States Patent Office 3,428,030
Patented Feb. 18, 1969

3,428,030
SMALL ANIMAL RESTRAINING BOX
Billy P. Updegraff, Oklahoma City, Okla., assignor to the United States of America as represented by the Secretary of the Army and/or the Administrator of the Federal Aviation Agency
Filed Dec. 8, 1966, Ser. No. 600,268
U.S. Cl. 119—96  3 Claims
Int. Cl. A01k 29/00

ABSTRACT OF THE DISCLOSURE

This invention concerns an improved small animal restraining box with an adjustable flexible wall for varying the size within a confining area of the box, a partition exteriorly of the box to receive on opposite sides the extended forelimbs of the animal and a head guard and support secured with the box and partition to receive the head of an animal.

---

The invention described herein may be manufactured and used by or for the Government for governmental purposes without the payment to me of any royalty thereon.

The invention relates to apparatus useful in restraining small animals such as cats, dogs, or rabbits for veterinary purposes, particularly for the administration of intravenous injections or blood sampling.

Many techniques for restraining animals for intravenous injections or for blood sampling, involve the use of two technicians. Usually one technician holds the animal while the other administers the injection or withdraws the sample. Occasionally a single, well-trained animal handler develops sufficient facility to manage these procedures alone. In either event, the possibility of injury resulting from scratches or bites is ever present.

It is therefore an object of my invention to provide the necessary restraint for small animals to enable one person to give intravenous injections or take blood samples in a safe and efficient manner.

A further object of my invention is to reduce the possibility of being bitten or scratched and at the same time reduce the physical discomfort of the animal.

A further object of my invention is to provide a device which will enable injections or blood samples to be taken successfully by persons who normally do not participate in such operations due to lack of knowledge of restraint methods or due to apprehension of being bitten or scratched.

A further object of my invention is to provide a restraining device which is easily and economically constructed and which is capable of restraining animals of various sizes.

These and other objects of my invention will become apparent as the description proceeds wherein:

FIG. 1 shows a perspective view of the preferred embodiment of the device with the lid raised;

FIG. 2 is a top view with the lid removed and showing a correctly positioned animal;

FIG. 3 is a front view with the lid closed;

FIG. 4 is a side view showing a means of adjusting the cinch strap; and

FIG. 5 is an enlarged view of a lower front corner of the box showing an optional modification.

Apparatus made according to the preferred embodiment of my invention (FIG. 1) consists essentially of a rectangular box with adequate space to enclose all but the head and forelimbs of a correctly positioned animal. The correct position refers to the animal's normal supine position. The device may be made from any common shop material, such as wood, aluminum, or plastic.

A lid 1 is attached either as shown using a hinge 2 and latches 3 or may be constructed in any other manner so as to allow the box to be opened and the animal placed therein.

A cinch strap 8 which may be made of any appropriate flexible material such as pliable plastic, rubber, elastic or leather, is secured to one inside wall 9 of the restrainer and adjustable on the other side to allow for a considerable variation of animal size. A rigid head guard 10 extends outward from the forward exterior wall 11 and borders a padded opening 12 which allows the animal ample space to protrude his head and breathe freely, while the head guard 10 insures a reasonably careful worker against being bitten. This accessibility of the protruding head is convenient during radial vein injections for checking the degree of anesthetization by the blink reflex and is necessary for auricular vein injections in the rabbit. Directly beneath the head guard 10 and bisecting the longitudinal plane of the device is a limb partition 13 which prevents a worker from being scratched by one forelimb of the animal while working on the other. Below the head guard 10 and to either side of the limb partition are openings 14 and 15 which allow the forelimbs to protrude when the animal has been correctly positioned. While the two openings described constitute the preferred embodiment, it is apparent that one opening extending the entire width of the box may be used without deviating from my invention.

In the preferred embodiment of the device, a cord 20 is attached to the free end 21 of the cinch strap 8. This cord 20 passes through the side of the box at a hole 22 and is secured to the outside of the box as shown most clearly in FIG. 4 at 23. It is apparent that other means of adjusting the cinch strap 8 may be used without deviating from the invention as described herein.

If desired, as shown in FIG. 5, an automatic release tourniquet 30 may be attached to the box. This is an optional feature of the invention and in some cases may not be desirable. The tourniquet may be mounted permanently or temporarily at any convenient location. The most convenient location is on the lower front corner of either side of the box as close to the leg holes as possible. This arrangement results in the tourniquet's flexible rubber loop being bent around the corner to encircle the animal's leg. When the loop is tightened, the leg is drawn close to the side of the box thereby constricting the blood vessel and limiting leg movement greatly thus further simplifying radial vein injections. This type of tourniquet is readily loosened with one hand by simply pressing its quick release button.

I claim:
1. An animal restraining device comprising:
   (a) a container;
   (b) means carried by said container including latching means providing access to the interior of said container;
   (c) a flexible member one end of which is attached to an interior side wall of said container with means provided for securing the other end of said flexible member in various positions adjacent to the opposite interior wall of said container;
   (d) one wall of said container provided with openings to permit portions of an animal to project exteriorly of said container;
   (e) support means coacting with a first one of said openings projecting exteriorly of said container and configured to receive the head of an animal and opening upwardly; and
   (f) partition means located exteriorly of said container, attached to the device, projecting forward thereof, bisecting the longitudinal plane of said container, separating an aligned pair of openings in said one wall of said container to isolate portions of an animal projecting exteriorly of said container.

2. The animal restraining device of claim 1 with means attached to said container provided to secure a tourniquet to a portion of an animal body projecting exteriorly of said container and cooperating with a wall of said container to restrict the movement of a portion of an animal.

3. An animal restraining device comprising:
  (a) a container including side walls, bottom wall, and cover means;
  (b) means carried by said container including latching means providing access to the interior of said container;
  (c) a flexible wall means secured to an intermediate portion of a side wall within the container to provide means for varying the size of the interior confining portion of said container;
  (d) means for securing said flexible wall by adjustably attaching said flexible wall to an opposite side wall;
  (e) one wall of said container provided with openings to permit portions of an animal to project exteriorly of said container; and
  (f) support means coacting with a first one of said openings to position a portion of an animal to project exteriorly of said container.

References Cited

UNITED STATES PATENTS

| | | | |
|---|---|---|---|
| 633,758 | 9/1899 | Herberg | 119—98 |
| 1,436,897 | 11/1922 | Novak | 119—99 |
| 2,498,051 | 2/1950 | Shipley | 119—99 |
| 3,187,721 | 6/1965 | Cappel | 119—103 |

FOREIGN PATENTS 113,788  4/1945  Sweden.

HUGH R. CHAMBLEE, *Primary Examiner.*